(12) United States Patent
Galitsky et al.

(10) Patent No.: US 9,646,078 B2
(45) Date of Patent: May 9, 2017

(54) SENTIMENT EXTRACTION FROM CONSUMER REVIEWS FOR PROVIDING PRODUCT RECOMMENDATIONS

(75) Inventors: Boris Galitsky, Palo Alto, CA (US); Eugene William McKenna, San Mateo, CA (US)

(73) Assignee: Groupon, Inc., Chicago, IL (US)

( * ) Notice: Subject to any disclaimer, the term of this patent is extended or adjusted under 35 U.S.C. 154(b) by 966 days.

(21) Appl. No.: 12/119,465

(22) Filed: May 12, 2008

(65) Prior Publication Data

US 2009/0282019 A1    Nov. 12, 2009

(51) Int. Cl.
*G06F 17/30* (2006.01)

(52) U.S. Cl.
CPC ............................ *G06F 17/30634* (2013.01)

(58) Field of Classification Search
CPC combination set(s) only.
See application file for complete search history.

(56) References Cited

U.S. PATENT DOCUMENTS

| | | | |
|---|---|---|---|
| 5,706,406 A | 1/1998 | Pollock | |
| 5,963,940 A * | 10/1999 | Liddy | G06F 17/30654 |
| 6,584,464 B1 | 6/2003 | Warthen | |
| 6,910,003 B1 * | 6/2005 | Arnold et al. | 704/4 |
| 7,444,356 B2 * | 10/2008 | Calistri-Yeh | G06F 17/30731 |
| 8,046,348 B1 * | 10/2011 | Rehling | G06F 17/30684 |
| | | | 707/603 |
| 8,195,683 B2 * | 6/2012 | Bolivar | G06F 17/30672 |
| | | | 704/257 |
| 8,949,243 B1 | 2/2015 | Kashyap et al. | |
| 2002/0103809 A1 * | 8/2002 | Starzl et al. | 707/102 |
| 2004/0059736 A1 * | 3/2004 | Willse et al. | 707/100 |
| 2004/0078190 A1 * | 4/2004 | Fass | G06F 17/241 |
| | | | 704/7 |
| 2004/0186719 A1 * | 9/2004 | Polanyi | G10L 17/26 |
| | | | 704/257 |
| 2004/0243554 A1 * | 12/2004 | Broder et al. | 707/3 |
| 2005/0108001 A1 * | 5/2005 | Aarskog | 704/10 |
| 2005/0165819 A1 * | 7/2005 | Kudoh et al. | 707/101 |
| 2005/0267871 A1 * | 12/2005 | Marchisio et al. | 707/3 |
| 2006/0069589 A1 * | 3/2006 | Nigam | G06Q 30/02 |
| | | | 706/55 |
| 2006/0277465 A1 * | 12/2006 | Pandit et al. | 715/531 |
| 2007/0073745 A1 * | 3/2007 | Scott et al. | 707/100 |
| 2007/0073758 A1 * | 3/2007 | Perry et al. | 707/102 |
| 2007/0094234 A1 * | 4/2007 | Wen | G06F 17/30675 |
| 2008/0109212 A1 * | 5/2008 | Witbrock | G06F 17/2785 |
| | | | 704/9 |
| 2008/0133488 A1 * | 6/2008 | Bandaru et al. | 707/3 |
| 2008/0154883 A1 * | 6/2008 | Chowdhury et al. | 707/5 |
| 2008/0294637 A1 * | 11/2008 | Liu | 707/6 |

(Continued)

OTHER PUBLICATIONS

Gil Emanuel Fuchs "Practical Natural Language Processing Question Answering Using Graphs", Dec. 2004, University of California.*

(Continued)

*Primary Examiner* — Polina Peach
(74) *Attorney, Agent, or Firm* — Alston & Bird LLP

(57) ABSTRACT

A system and method for recommending a product to a user in response to a query for a product with a feature wherein the recommendation is accompanied by a quotation expressing a sentiment about the feature or the product.

22 Claims, 8 Drawing Sheets

(56) References Cited

U.S. PATENT DOCUMENTS

| | | | |
|---|---|---|---|
| 2009/0077069 A1* | 3/2009 | Polanyi | G06F 17/30622 |
| 2009/0216524 A1* | 8/2009 | Skubacz | G06F 17/2785 |
| | | | 704/9 |
| 2009/0217208 A1* | 8/2009 | Mushtaq | G06F 17/30864 |
| | | | 715/854 |
| 2009/0222551 A1 | 9/2009 | Neely et al. | |
| 2013/0018892 A1 | 1/2013 | Castellanos et al. | |
| 2013/0263019 A1 | 10/2013 | Castellanos et al. | |
| 2013/0311315 A1 | 11/2013 | Zises | |
| 2015/0286928 A1 | 10/2015 | Demiralp et al. | |

OTHER PUBLICATIONS

"Computing Attitude and Affect in Text: Theory and Applications," Shanahan, J., Qu, J. and Wiebe, J., Eds., 2006, Springer, pp. 265-279, Dordrecht, Netherlands.

Das, S.R. et al., "Yahoo! for Amazon: Sentiment Extraction from Small Talk on the Web," Management Science, Jan. 5, 2006, pp. 1-30.

Gamon, M., "Sentiment Classification on Customer Feedback Data: Noisy Data, Large Feature Vectors, and the Role of Linguistic Analysis," International Conference on Computational Linguistics, 2004, 7 pages.

Glance, N. et al., "Deriving Marketing Intelligence from Online Discussion," KDD '05, Aug. 21-24, 2005, Chicago, Illinois, USA, ACM, 9 pages.

Pang, B. et al., "Thumbs Up? Sentiment Classification Using Machine Learning Techniques," in Proceedings of the Conference on Empirical Methods in Natural Language Processing (EMNLP) 2002, Jul. 2002, Philadelphia, 8 pages.

Wiebe, J. et al., "Identifying Collocations for Recognizing Opinions," in Proceedings of ACL/EACL '01 Workshop on Collocation, Jul. 2001, Toulouse, France, 8 pages.

"Kango Announces Series A Funding and Private Beta Status," Press Release. UpTake Networks, Inc., 2007, [Online] [Retrieved on Jun. 25, 2009] Retrieved from the Internet<URL: http://www.uptake.com/documents/press/121807.pdf>.

PCT International Search Report and Written Opinion, PCT Application No. PCT/US09/43658, Jul. 14, 2009, 8 pages.

Office Action for U.S. Appl. No. 15/073,486 dated Sep. 19, 2016.

U.S. Appl. No. 61/922,786, filed Dec. 31, 2013.

* cited by examiner

Kango

605

Your Profile  Sign Out

[Destinations] [Lodging] [Things to Do]

| Family Friendly Hotel Campground | WHERE | Maui | [Search] |

REFINE YOUR SEARCH:                           610

| Vacation Theme | Lodging Type | Price | Hotel Amenity | | |
|---|---|---|---|---|---|
| 👫 Family Vacation☉ | ☑ Hotels<br>☐ Campgrounds<br>☐ Bed and Breakfasts | ☐ Under $50<br>☐ $50 - $150<br>☑ $150 - $250<br>☐ $250 - $350<br>☐ $350 and above | ☐ Pool<br>☐ Jacuzzi<br>☐ Exercise Facility<br>☐ Spa Treatments<br>☐ Restaurant | ☐ Room Service<br>☐ Cocktail Lounge<br>☐ Free Breakfast<br>☐ Minibar<br>☐ Refrigerator | ☐ Kitchen<br>☐ In-room Movies<br>☐ Internet Access<br>☐ Concierge<br>☐ Shuttle Service |

ResortQuest Maui Kaanapali Villas  ←——615
RELEVANCY: 98% FAMILY VACATION

ESTIMATED PRICE
$141-$158/night

➡ Check Rates

RATINGS FROM ACROSS THE WEB

Yahoo! Travel    ★★★★★    39+ reviews

Travelocity      ☺☺☺☺○    40+ reviews

TripAdvisor      1 2 3 4 5  4.0    155+ reviews

HIGHLIGHTED AMENTIES:
   children's pool, outdoor pool, kitchen, refrigerator,
   microwave, family/oversized room, pool, mai...  ←——620

TRAVELER REVIEWS FROM ACROSS THE WEB
   (read all)
   "Absolutely the best place for families."  ←——625
     A Yahoo! Travel user "toward adults which we enjoyed we are in our 20s and
   loved the place."
     A TripAdvisor Member ResortQuest Kaanapali Shores
RELEVANCY: 98% FAMILY VACATION ESTIMATED PRICE
$179/night ➡ Check Rates

RATINGS FROM ACROSS THE WEB

TripAdvisor    1 2 3 4 5  4.0    311+ reviews

Yahoo! Travel    ★★★★☆    66+ reviews

HIGHLIGHTED AMENTIES:
   outdoor pool, game room, kitchenette, kitchen,
   refrigerator, microwave, family/oversized room, po...

TRAVELER REVIEWS FROM ACROSS THE WEB
   (read all)
   "the little one loved the beach, warm water and gentle surf"
     AnonymousMe "I've brought my family of 5 here 3 times and we all love it."
     AnonymousUser Google (map showing Maui with markers A, B, C, D, E)

Fig. 6

SENTIMENT EXTRACTION FROM CONSUMER REVIEWS FOR PROVIDING PRODUCT RECOMMENDATIONS

BACKGROUND

Field of Art

The present disclosure is directed to recommending products to users based upon topical and sentiment data extracted from documents about products and providing users quotes from documents relevant to the features of interest to the user.

Description of Related Art

When purchasing online, consumers are interested in researching the product or service they are looking to purchase. Currently, this means reading through reviews written on websites of different vendors that happen to offer the product or service. For example, if the consumer is interested in purchasing a digital camera, several on-line vendors allow consumers to post reviews of cameras on the website. Gathering information from such reviews is still a daunting process as there is little way to sort the reviews for the features that are of interest to any one potential buyer so the potential buyer must read through them manually. Sometimes reviewers rate a product with a given number of stars in addition to making comments. An average high or low number of stars is not necessarily very informative to a potential buyer, especially if he or she is especially concerned about certain features on the camera. For example, a potential buyer may want a camera from which the photographs come out with very true colors as opposed to oversaturated colors. Other features, such as the weight of the camera or the complexity of the controls are of lesser concern to this potential buyer. A review with many stars may extol the virtues of the ease of changing batteries of the camera and a review of few stars may complain that the camera only has a 3× optical zoom. Neither of these reviews is relevant to the potential buyer. In order to determine that however the potential buyer must wade through comments, if any, provided by the reviewer that explain why the reviewer scored the camera a certain way. This is a highly time consuming process.

Analyzing a document for presence of sentiment within the document via a fine-grained NLP-based textual analysis is disclosed in J. Wiebe, T. Wilson, and M. Bell, "Identifying collocations for recognizing opinions," in Proceedings of ACL/EACL "01 Workshop on Collocation, (Toulouse, France), July 2001. B. Pang, L. Lee, and S. Vaithyanathan, "Thumbs up? sentiment classification using machine learning techniques," in Proceedings of EMNLP 2002, discloses a machine learning classification-based approach utilizing statistics to analyze movie reviews and extract an overall sentiment about the movie. That means that a significantly large sample size is required in order to provide meaningful results. This statistical approach averages through the whole review document and results in a global assessment of the feature and associated sentiment. The approach is not sensitive enough to allow for the extraction of a sentence or phrase from a review and identify both its sentiment and its topic.

More recently, other researchers have made progress in determining not only the sentiment but the topic about which the sentiment is being expressed. Nigam and Hurst have published a method for determining an overall sentiment for a particular product by analyzing multiple messages posted on-line about that product. "Towards a Robust Metric of Opinion" in *Computing Attitude and Affect in Text: Theory and Applications*. Shanahan, J., J. Qu, and J. Wiebe, Eds. Dordrecht, Netherlands: Springer, 2006, pp. 265-280. This method also does not allow for, in addition to the overall sentiment and topic determination, local extraction to determine a specific quote from the analyzed messages that exemplifies the sentiment about that topic. Such a quote would be useful to serve as an argument for why this particular product is recommended.

SUMMARY

The present disclosure presents systems and methods for providing topical sentiment-based recommendations based on a rules-based analysis of electronically stored customer communications. One aspect of a system incorporates polarity, topicality and relevance to customer request. The system also is able to present to a user, in response to a query about a specific feature about a product, a quote from another consumer's review that is responsive to the user's query. The system provides methods for utilizing rule-based natural language processing (NLP) and information extraction (IE) techniques to determine the polarity and topicality of an expression. Additionally a system for automatic generation of customer recommendation communications is also provided. The present disclosure also provides systems for computing a numeric metric of the aggregate opinion about a hierarchy of topic expressed in a set of customer expressions.

The disclosure herein also illustrates a system for analyzing a document to determine a product being discussed in the document and sentiments about the product as well as individual features of the product and sentiments about the individual features. The system further identifies exemplary sentences or phrases from the analyzed document that provide an opinion of the product or a feature of the product.

Further, sentiments about the product and its features are aggregated to determine a score which is stored in addition to storing the exemplary sentences or phrases from each analyzed document. In response to a query from a user the system returns recommendations that include scores and sentiments about the product and/or features of interest to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 6 is a screenshot illustrating the user interface displaying recommendations returned in response to a search query according to one embodiment.

DETAILED DESCRIPTION

Figure 1:
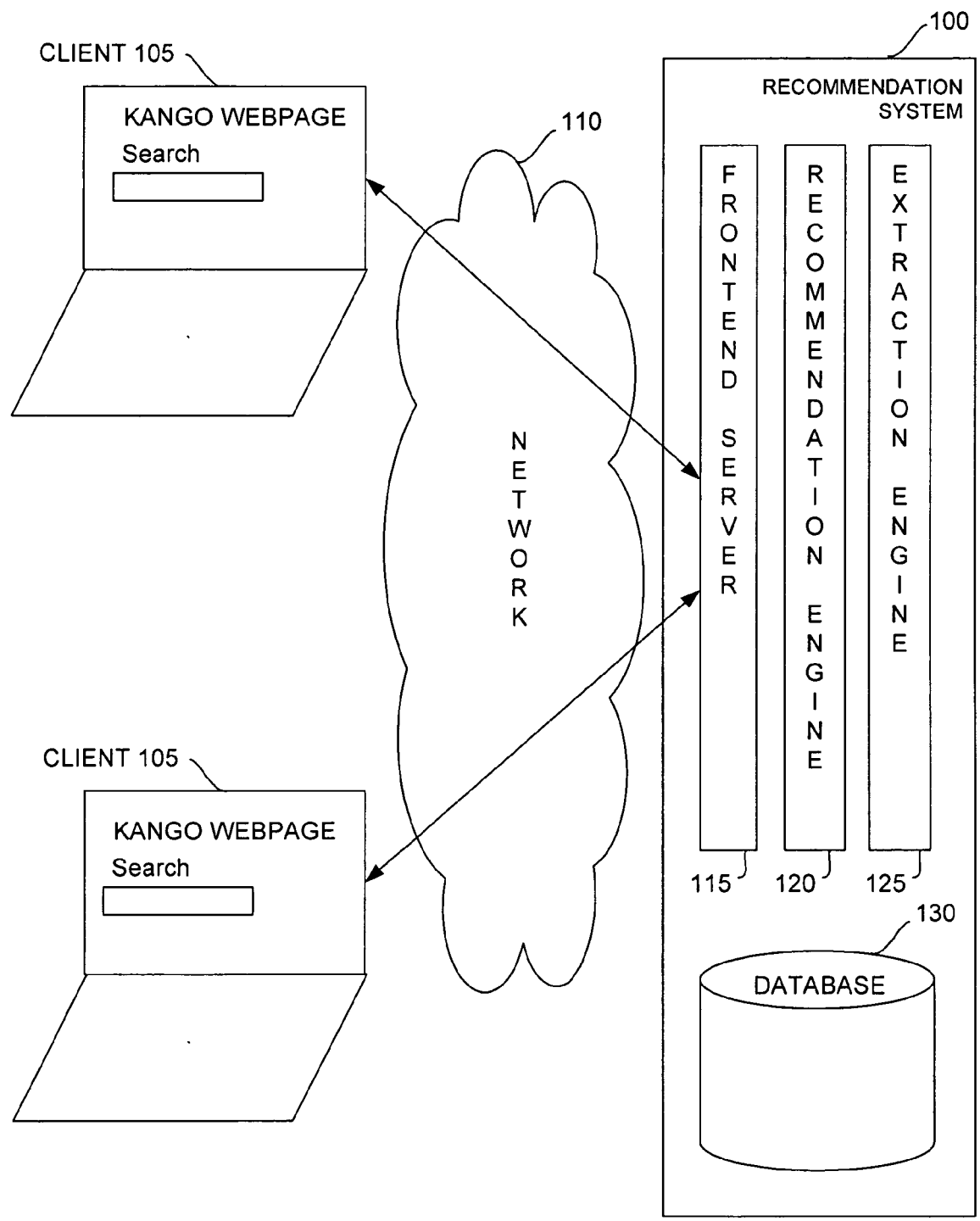
FIG. 1 is a diagram of the system according to one embodiment.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimable subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In one embodiment, as discussed herein, the following terms are introduced below. The terms are provided for ease of discussion with respect to the principles disclosed herein.

"Text model" is an expression which includes a feature and a sentiment.

"Feature" is a characteristic of the product and that characteristic can be an item or an abstract characteristic. A feature can be a swimming pool or a characteristic such as "family-friendly." Features related to travel themes, amenities of travel products and suitability for categories of travelers include "view", "good for children", "good for pets," "safe for single female travelers," "safe for teenagers," "location", and "ambiance". If a document indicates that a hotel has a babysitting service, the feature "family friendly" can then be implicit from the feature babysitting service.

"Sentiment" is an expression of a subjective judgment or determination. "Sentiment" can be embodied by adjectives, verb expressions, negations or indirect indications. Sentiment is also assigned a value, −1, −0.5, 0, 0.5, or 1. For example, the adjectives "awful," "so-so," "good," and "great" are, respectively, −1, −0.5, 0.5, and 1. The verb expressions "I dislike" and "I like" are, respectively, −0.5 and 0.5. Negations, including, "not", "would not", "no", and "instead" usually refer to a negative sentiment and have a value of −1. Examples of indirect indications of sentiment and their values include "would return," (+0.5); "worth doing," (+1); "never wanted to leave the room," (+1 for the feature "Romantic travel"); "never come again" (−1); and "safe to travel on my own," (+1). In some instances, sentiments overlap with features. For example, the phrase "clean room" indicates a positive sentiment in the word, "clean." Additionally "cleanliness" is a feature of a product, such as a hotel. A sentiment value of 0 indicates that there is no sentiment indicated in the phrase extracted.

"Atoms" are the building blocks of templates. They include sentiments, features, amplifiers ("even," "very," "never," "always",), negations, and mental and special states ("knowing", "believing", "changing", "returning", "liking") which are correlated with sentiments. Mental and special states may attenuate them or make irrelevant. Atoms are associated with rules which extract sentiments from text directly, and use other semantic constructions to assess the overall sentiment meaning of sentences. Mental state atoms usually dilute a sentiment or evidence ("did not know if restaurant was good" vs "restaurant was not good"). Certain state atoms might invalidate the sentiment value as well: "swimming pool was not open" as opposed to, "it did not look like swimming pool at all!"

"Semantic template" is an unordered set of atomic semantic templates. Simple examples are <sentiment><amplifier><feature>, <negation><sentiment><feature>, <mental><sentiment><feature>. An "atomic semantic template" includes a <feature> and a <sentiment>.

"Syntactic template" is a word, an ordered list of words or word occurrence rules with certain limitations for the forms of these words. There are multiple syntactic templates for a given semantic template. Each syntactic template corresponds to multiple phrasings of the same meaning. For the atomic semantic template <sentiment><amplifier><feature> syntactic templates would be <"very" or "quite" or "rather"><"poor" or "bad" or "unpleasant"><"stuff" or "bellman" or "porter" or "reception">. Such syntactic template forms a rule that would be satisfied by a sentence like "very poor porter", "quite unpleasant experience with reception."

Complex semantic templates consist from multiple atomic semantic templates, like "feature1-sentiment1 but feature2-sentiment2" where sentiment 1 and sentiment2 have different signs—one positive and the other negative. For example, "room was clean, but the service was not perfect" would be covered by this semantic template.

"Information retrieval queries" are the implementations of syntactic templates for search through the indexed text. Queries include disjunctions of the allowed forms of words "pool or pools or swimming pool" with distances (numbers of words in between) and prohibited words. An example of a prohibited word in the case of "pool" is "billiard" when the word "pool" is meant to refer to a "swimming pool." These queries take into account stemmed and tokenized forms of words. An example of an information retrieval query is a span query.

"Span query" is a query that combines the constraint on the occurrence of words with the constraints of mutual positions of the words. Span queries implement information extraction based on syntactic templates. An example of a span query would be "put-1-down" which allows 0 or 1 word in between "put" and "down."

"Lexicography" are the words which occur in syntactic templates. The words that are part of a lexicography are keywords. There are lexicographies for each of the features of atomic semantic templates. There are global lexicographies for sentiments, amplifiers and negations. Additionally there are lexicographies of positive and negative sentiments that correspond to individual features. There are positive and negative lexicographies for each feature. The structure of lexicographies is hierarchical. The global positive sentiment lexicography includes "nice", "great", "quiet." However, general positive sentiment "quiet" is not part of the positive lexicography for the feature "nightlife." An example of a lexicography for the feature "family friendly" would include other words that are associated with a place being family friendly. Those include swimming pool, playground and the like. As explained in reference to FIG. 3A, span queries in the disclosed method act to extract quotations. Therefore the lexicography used in building the span queries is necessarily more detailed than a more traditional lexicography.

System Architecture

FIG. 1 is a diagram of the system according to one embodiment. The system comprises a client 105, a network 110, and a recommendation system 100. The system 100 further comprises a front end server 115, a recommendation engine 120, an extraction engine 125 and a database 130. The elements of the recommendation system 100 are communicatively coupled to each other. The client 105 communicates with the recommendation system 100 via the network 110.

The client 105 is any computing device adapted to access the recommendation system 100 via the network 110. Possible clients 105 include, but are not limited to, personal computers, workstations, internet-enabled mobile telephones and the like. While only two clients 105 are shown for example purposes, it is contemplated that there will be numerous clients 105.

The network 110 is typically the Internet, but may also be any network, including but not limited to a local area network, a metropolitan area network, a wide area network, a mobile, wired or wireless network, a private network, or a virtual private network, and any combination thereof.

The front end server 115, recommendation engine 120 and extraction engine 125 are implemented as server programs executing on one or more server-class computers comprising a central processing unit (CPU), memory, network interface, peripheral interfaces, and other well known components. The computers themselves preferably run an open-source operating system such as LINUX, have generally high performance CPUs, 1 gigabyte or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

Figure 2:
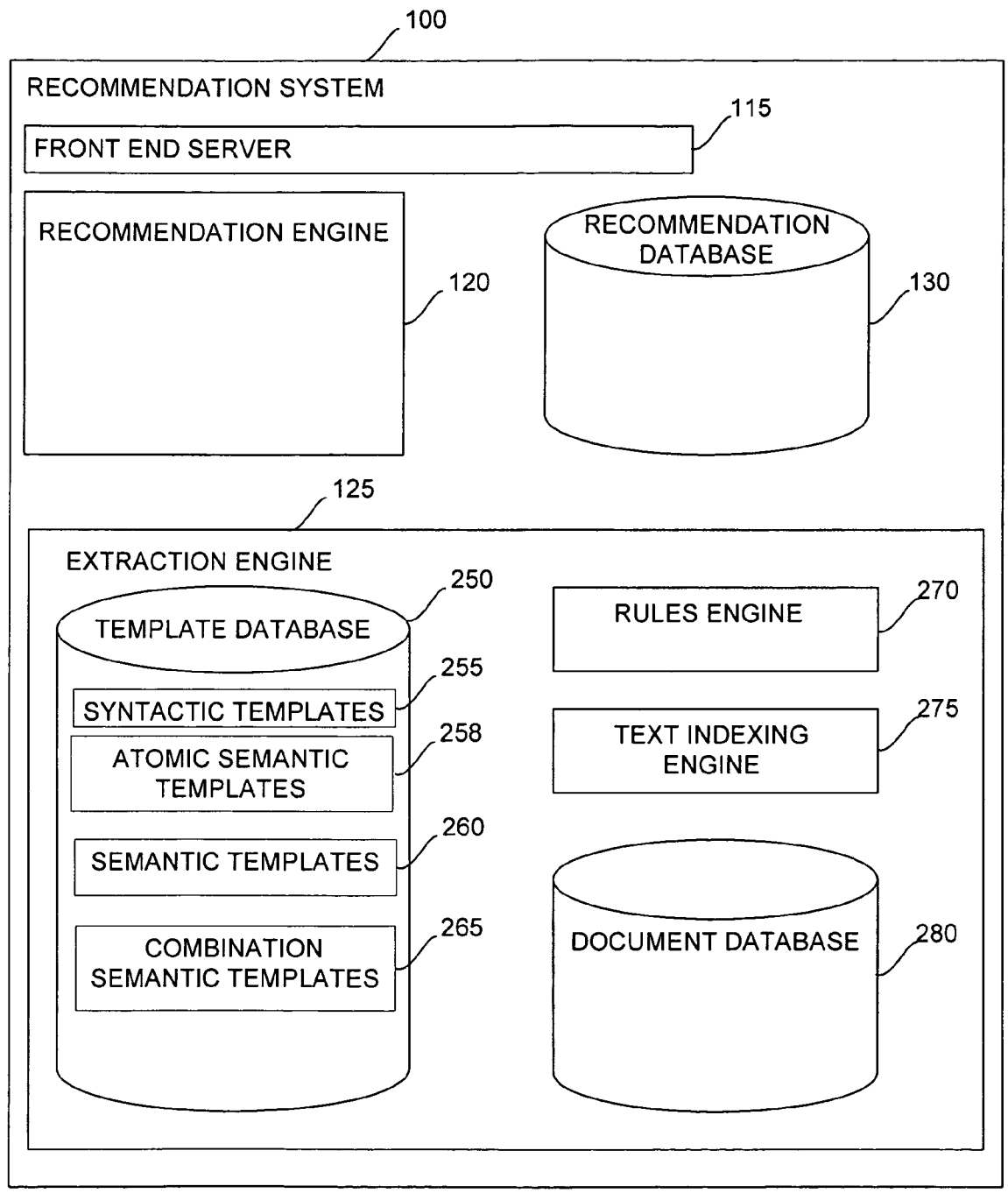
FIG. 2 is a diagram of the system architecture according to one embodiment.

FIG. 2 is a diagram of the system architecture according to one embodiment. The recommendation system 100 comprises the front end server 115, recommendation engine 120, extraction engine 125, and recommendation database 130. The extraction engine 125 further comprises a template database 250, a rules engine 270, a text indexing engine 275 and a document database 280. The template database stores the syntactic templates 255, atomic semantic templates 258, semantic templates 260 and combination semantic templates 265. The document database 280 stores the documents to be analyzed after indexing.

The databases may be stored using any storage structure known in the art. Examples of database structure include a hash map or hash table. The rules engine is implemented on a server computer as described for the other servers in reference to FIG. 1.

The function of each element of the system is described in further detail in reference to FIGS. 3-7.

Process Flow

Introduction

Very broadly, a system and method as disclosed comprises obtaining information about products from various sources on the internet. These sources include descriptions of the product on the websites of the manufacturer and retailers and comments about the product from consumers which may be at the websites of the manufacturer and retailers but also anywhere else on the internet such as chat rooms, message boards and on web logs. Queries are assembled to extract relevant information from the obtained information. Using the queries, information about the products, features of the products and sentiments about the products and features of the product are extracted and stored. This data is used to determine a score not only for the product as a whole but also features of the product. In addition, the method is capable of local extraction of phrases and sentences about an individual feature of the product and identifying that phrase or sentence as belonging to the individual feature. That is also stored for later presentation to a user searching for that individual feature of a product.

When a user enters a search query for a product, the system analyzes the search query for features of interest to the user in addition to the product of interest to the user and makes a recommendation of not only a product but also the overall score for that product, a score for the feature of interest to the user and a quote about the feature of interest to the user.

Building Lexicography and Queries

A lexicography is built for the particular product for which documents will be analyzed. Building lexicographies is well known in the art. The lexicography for a product or feature may be built manually or it may be built by machine. In either scenario, representative documents about the product or feature are analyzed and words that are useful in analyzing and classifying the product or feature are extracted and added to the lexicography. In building a lexicography for the feature, "family-friendly," for a hotel, feature words that are explicit, such as references to family and relatives are added. More complex features like "pet-friendly" are then added. This is more complex because references to pets in reviews of hotels are not always relevant to whether or not the hotel did or did not allow pets to stay there. Therefore a more detailed analysis of prohibitive words in syntactic templates is required. Other activity-related features also require more detailed analysis. For example, "bat" and "tank" both have meaning in the sports of baseball and diving as well as in other domains such as animals for "bat" and reading for "diving" as in "diving into books." Furthermore, N-gram word occurrence analysis is performed to verify that syntactic templates created cover most frequent expressions in available product reviews.

Figure 3:
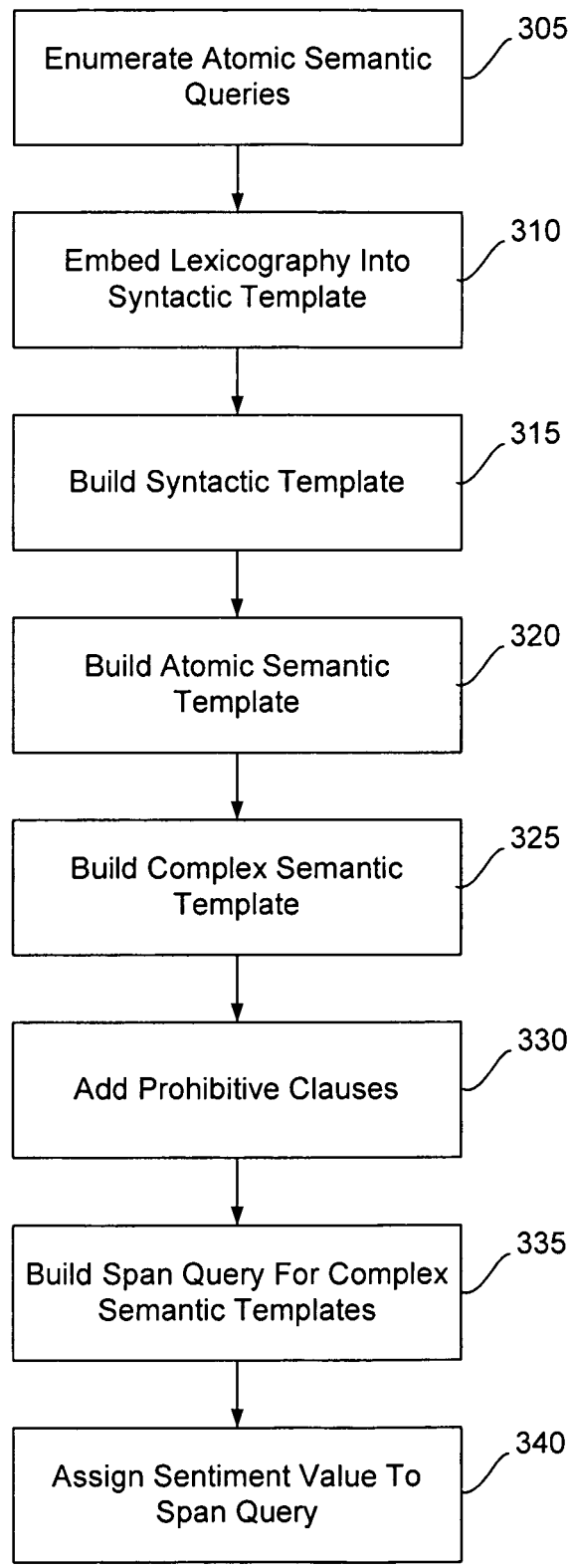
FIG. 3 is a graphic illustrating a method for building a query for each atomic semantic template.

From the lexicography, queries are built for analyzing the documents collected about the product. FIG. 3 is a flow chart illustrating a method for building a query for each semantic template. These queries are then used to extract information from source documents. This process is applied separately for positive sentiments and negative sentiments. First, a complex template is built from atomic templates by enumerating 305 atomic semantic queries. As an example, to build a complex template to ascertain sentiments about a swimming pool at a hotel, atomic templates would include <sentiment><amplifier><feature>. Phrases that would be extracted with such a template include, "there was a very nice swimming pool," and "the pool was very good." These both are extracted because the order of the words in an atomic template is usually not relevant. The lexicography for a particular feature—either the positive or the negative—is embedded 310 into a syntactic template. A syntactic template is built 315 for keywords in the lexicography. Next an atomic semantic template is built 320. The atomic semantic template covers all of the possible phrasings of the same sentiment—the various syntactic templates above for positive sentiments about the swimming pool for example. The disjunction of the syntactic templates is used to build 325 a complex semantic template. Prohibitive clauses are then added 330 to avoid quote extraction in the wrong context. A prohibitive clause is an expression that does not have sentiment associated with it for that feature. For example, for the feature, "pet-friendly," "dog house" conveys neither positive nor negative sentiment. Therefore, it would be a prohibitive clause when looking to extract quotes that indicate either positive or negative sentiment about the pet friendliness of a hotel. Building of atomic semantic templates is described in further detail in reference to FIG. 3A. A span query is built 335 for each complex semantic template. The resulting span query is assigned 340 a sentiment value which can be expressed as a number, for example, −1, −0.5, 0, 0.5, or 1. Span queries are traditionally implemented as search queries. However, in the disclosed method, the span query also acts as an extraction tool to identify the topic and sentiment of an individual phrase or sentence and then extract that very phrase or sentence as a quotation. Span queries utilized in this capacity are necessarily more complex than those utilized as search queries in conventional keyword searching of documents.

Figure 3A:
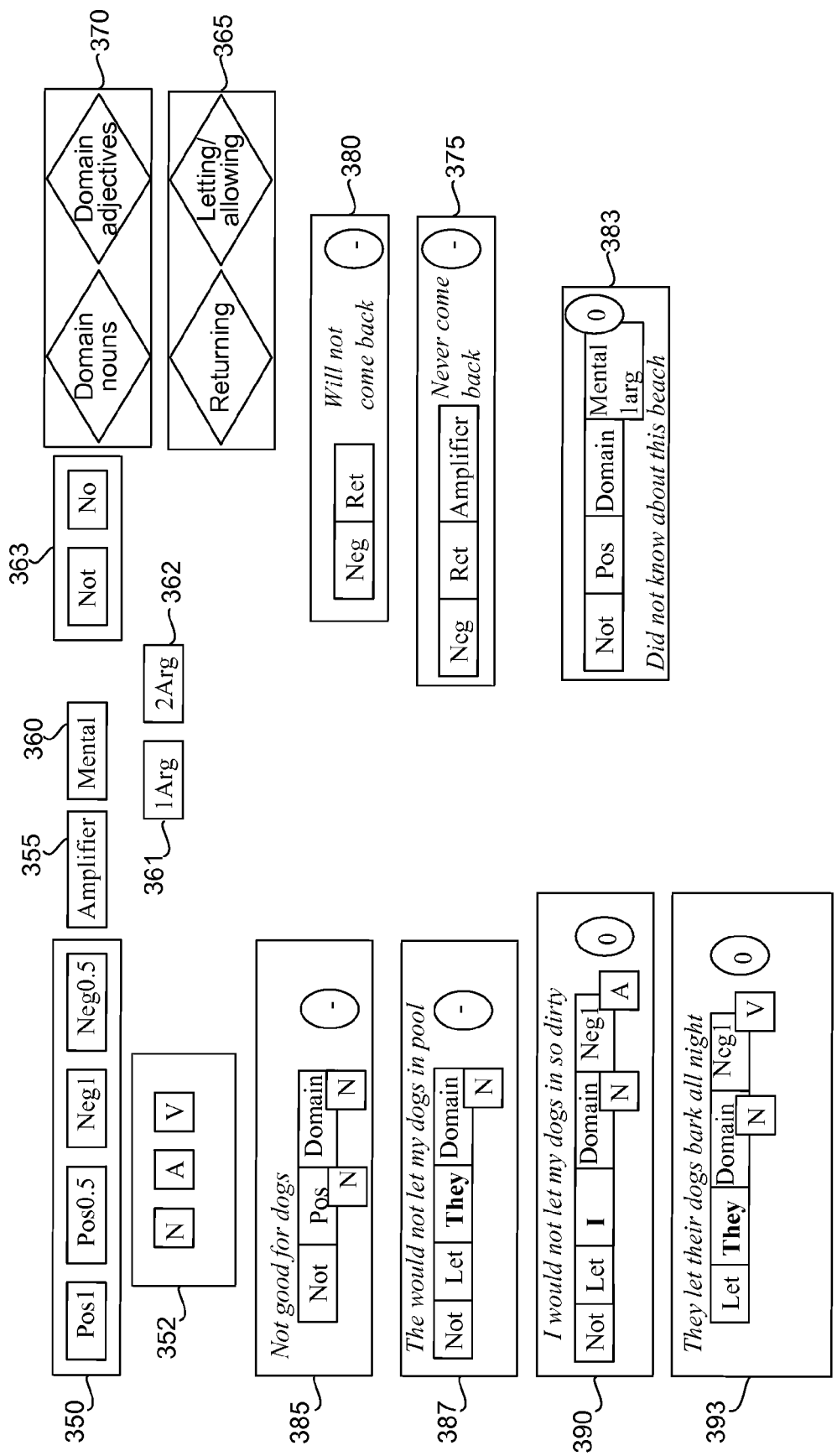
FIG. 3A is a graphic illustrating a method for building an atomic semantic template.

FIG. 3A is a graphic that describes in further detail the building of an atomic semantic template from its components and the resulting lattice of semantic templates used to analyze a document. These semantic templates make it possible to identify the topic and sentiment of individual sentences and phrases in a document. This improvement allows not only for showing users quotations from documents that are relevant to the user's query, but also allows for determining a score for a product or feature with fewer source documents than are required by traditional statistics-based methods. The atomic semantic templates in FIG. 3A are for the analysis of travel products. The negative and positive indicators 350 are: Pos1, Pos0.5, Neg1, Neg0.5. The parts of speech 352 include N for nouns, A for adjectives, and V for verbs. An amplifier 355 is a word or phrase which increases the evidence of the meaning of semantic template to which they are attached. Amplifiers 355 include "never," "very," and "always."

Mental atoms 360 can distort the meaning of the atomic semantic template. Mental atoms, which can also be referred to as predicates, have two possible arguments. The first is 1Arg 361 over the agent who commits a mental or communicative action. The second is 2Arg 362 over the agent who passively receives this action. Examples of mental atoms 360 include "knowing" and "recommending."

Negating words 363 are those that reverse the polarity of what the sentence would be without the negating word. Negating words include "not" and "no." For example, "I will come back" and "I will not come back" are similar except that they convey opposite sentiment evidenced only by the word "not" being added to the second sentence.

The example "did not know about this beach" 383 illustrates the interplay of a mental atom 360, "know," and a negating word 363, "not." "Not" could reverse the polarity of the sentiment of what the phrase would otherwise be except that the presence of the word "knowing" distorts the meaning. That the speaker did not know of the presence of a beach is neither the positive nor negative about the destination where that beach is located. The presence of mental atoms 360 in the atomic semantic template accounts for this eventuality.

Special cases 365 are concepts that, in addition to the mental atoms 360, can distort the meaning of the atomic semantic template. The special cases 365 identify a group of words that convey the concept. The concept for a special case is dependent on the product or feature being analyzed. In the case of travel products, whether or not a consumer would return to that destination, hotel, or restaurant, is an indication of that consumer's satisfaction with the destination, hotel or restaurant. However, in purchasing a camera, the concept of "returning" is not a special case. In the instant example "letting" is another special case 365. Whether or not a consumer would let someone else go to that destination is indicative of consumer satisfaction. Another word that expresses this special case is "allow." In 375, the words "come back" are a phrase that expresses the special case 365 of "returning."

Domain atoms 370 are characteristics of a feature. They can be expressed as nouns or adjectives. Examples include "dog friendly," "clean," and "quiet."

An atomic semantic template is considered to cover a sentence or phrase from a document if this sentence satisfies all constraints from the template. Some words can fulfill multiple components of an atomic semantic template. For example, "never" is an amplifier as well as a negating word and can fulfill both requirements in an atomic semantic template. "I will not come back" and "I will never come back" are both covered by the templates <Neg><Ret> 375. Only "I will never come back is covered by <Neg><Ret><Amplifier> 380. That is because "never" is both an amplifier 355 and a negating word 363.

Atoms may include the terms in the form of nouns, adjectives or other parts of speech. The part of speech may be included in the atomic semantic template if it is relevant to distinguishing the feature. An example is <sentiment><feature(noun)> which is fulfilled by "not good for dogs." Another example 385 that covers "not good for dogs" is <not><pos><domain>.

Semantic templates are assigned a template sentiment value. This value may be expressed as a number, −1, −½, 0, +½, or 1.

As shown in FIG. 3A, the atomic semantic templates are arranged in a hierarchy and there is order between some pairs of semantic templates. This order reflects how specific to a given feature or sentiment the atomic semantic templates are. Generally, ST 1>ST 2 if ST 2=ST 1+ "additional atom" wherein A>B indicates that B is more specific than A and A<B indicates that A is more specific than B. In the above example, ST 2 is an extension of ST 1 because it is more specific. For determining the sentiment within the hierarchy, if ST 1>ST 2 then template sentiment value of ST1=template sentiment value ST 2. If however, ST 1<ST 2 then the template sentiment values are not necessarily the same. Conflicts such as these can occur when an atomic semantic template is an extension of more than one other semantic template.

In FIG. 3A, semantic templates closer to the top of the figure are less specific and therefore > semantic templates lower down on the figure. For example, ST <Neg><Ret> is less specific (>) than <Neg><Ret><Amplifier>. For a given semantic template, additional semantic templates with additional constraints are built.

At the top of the hierarchy, two semantic templates are shown, <not><pos><domain>, 385 and <neg><ret>, 375. "Will not come back" is covered by 375 and "Not good for dogs" is covered by 385. These are extended to create more complex semantic templates—"They would not let my dogs in" which is covered by <not><let><They><domain> 387; "I would not let my dogs in—so dirty" which is covered by <not><let><I><domain><neg1> 390; and "They let their dogs bark all night" which is covered by <let><They><domain><neg1> 393 for 385. A more specific template for 380 is 375, <neg><ret><amplifier> which covers "Never come back." This is accomplished by adding amplifiers, predicate-arguments, mental atoms and special cases. As explained previously the template sentiment for 375 and 380 is the same because ST 2=ST1+<amplifier>.

In the case of 385, there is more than one extension semantic template and in this instance they are not all continually more specific. This is referred to as the extension of the template being inconsistent. If they were consistent, the specificity would be described as follows: $ST > ST_1$ & $ST > ST_2 : ST > ST_1, ST_2$. When they are not consistent, there are conflicts between the atomic semantic templates.

In order to complete the analysis of a phrase or sentence and determine both the topic and sentiment, the conflict between the atomic semantic templates must be resolved. Broadly, this requires a method for reasoning when there are conflicting theorems. In the disclosed method, the conflicting theorems are the conflicting atomic semantic templates. Two major classes of methods for reasoning when there are conflicting theorems are non-monotonic reasoning and argumentation-based approaches.

Within argumentation-based approaches, there are several options. These vary in how the strength of the arguments is measured. Some methods are based on the abstract binary order between the rules.

In the disclosed method, the conflict between the atomic semantic templates is resolved using an argumentation-based approach which uses the order of the specificity of the atomic semantic templates and defeasible reasoning. The approach is a rules-based system that includes two classes of rules—rules that are absolute and those that may be violated. Such a rules-based system determines which of the conflicting semantic templates that cover the phrase or sentence is most specific. The sentiment of that most specific semantic template will be the sentiment of that extracted phrase or sentence.

A defeasible logic program ("DLP") is an example of such a rules-based system. DLP is known in the art, for example as set forth by Garcia and Simari in "Defeasible Logic Programming: an argumentative approach" in *Theory and Practice of Logic Programming* 4(1), 95-138 (2004). For the disclosed method, DLP is applied resolve the inconsistent semantic templates. In DLP, a dialectic tree is built. DLP is a set of facts (that the sentence is covered by all of the relevant semantic templates); strict rules, $\Pi$; and defeasible rules, $\Delta$. The strict rules are of the following form: $ST_A$:-$ST_B$, when it is always true that template sentiment value($ST_A$)=template sentiment value ($ST_B$). The defeasible rules are of the form ($ST_A > -ST_B$), where $ST_B > ST_A$. (an atomic semantic template usually, but not always implies its extension). $ST_A$ may occur in a defeasible rule as a negation ($\sim ST_A > -ST_B$) if there is no order relation between $ST_A$ and $ST_B$.

Let $P=(\Pi, \Delta)$ be a de.l.p. and L a ground literal. A defeasible derivation of L from P consists of a finite sequence $L_1, L_2, \ldots, L_n = L$ of ground literals, and each literal $L_i$ is in the sequence because:

(a) $L_i$ is a fact in $\Pi$, or (b) there exists a rule $R_i$ in P (strict or defeasible) with head $L_i$ and body $B_1, B_2, \ldots, B_k$ and every literal of the body is an element $L_j$ of the sequence appearing before $L_j$ (j<i.)

Let h be a literal, and $P=(\Pi, \Delta)$ a DLP ... <A, h> is an argument structure for h, if A is a set of defeasible rules of $\Delta$, such that:

1. there exists a defeasible derivation for h from $=(\Pi \cup A)$
2. the set $(\Pi \cup A)$ is non-contradictory, and
3. A is minimal: there is no proper subset $A_0$ of A such that $A_0$ satisfies conditions (1) and (2).

Hence an argument structure <A, h> is a minimal non-contradictory set of defeasible rules, obtained from a defeasible derivation for a given literal h. <$A_1$, $h_1$> attacks <$A_2$, $h_2$> if there exists a sub-argument <A, h> of <$A_2$, $h_2$> ($A \subseteq A_1$) so that h and $h_1$ are inconsistent. Argumentation line is a sequence of argument structures where each element in a sequence attacks its predecessor. There are a number of acceptability requirements for argumentation lines outlined in Garcia and Simari. The definition of dialectic tree gives us an algorithm to discover implicit self-attack relations in users' claims. Let <$A_0$, $h_0$> be an argument structure from a program P. A dialectical tree for <$A_0$, $h_0$> is defined as follows:

1. The root of the tree is labeled with <$A_0$, $h_0$>
2. Let N be a non-root vertex of the tree labeled <$A_n$, $h_n$> and A=[<$A_0$, $h_0$>, <$A_1$, $h_1$>, ..., <$A_n$, $h_n$>] the sequence of labels of the path from the root to N. Let [<$B_0$, $q_0$>, <$B_1$, $q_1$>, ..., <$B_k$, $q_k$>] all attack <$A_n$, $h_n$>. For each attacker <$B_i$, $q_i$> with acceptable argumentation line [$\Lambda$,<$B_i$, $q_i$>], there is an arc between N and its child $N_i$.

For example if there are the following semantic templates that cover a sentence: {$ST_c$, $ST_d$, $ST_e$, $ST_f$, $ST_g$ $ST_k$, $ST_i$}, and $ST_a$ is the most specific template, whose sentiment value should be determined. Other semantic templates which link $ST_a$ with {$ST_c$, $ST_d$, $ST_e$, $ST_f$, $ST_g$ $ST_k$, $ST_i$} in the following DLP:

---

$ST_a$-<$ST_b$; $ST_b$-<$ST_c$; ~$ST_b$-<$ST_c$, $ST_d$;
~$ST_b$-<$ST_e$; ~$ST_f$<$ST_g$, $ST_h$; ~$ST_h$-<$ST_j$;
~$ST_b$<$ST_c$, $ST_f$; $ST_f$-<$ST_g$; ~$ST_f$-<$ST_i$;
~$ST_h$-<$ST_k$

---

Figure 3B:
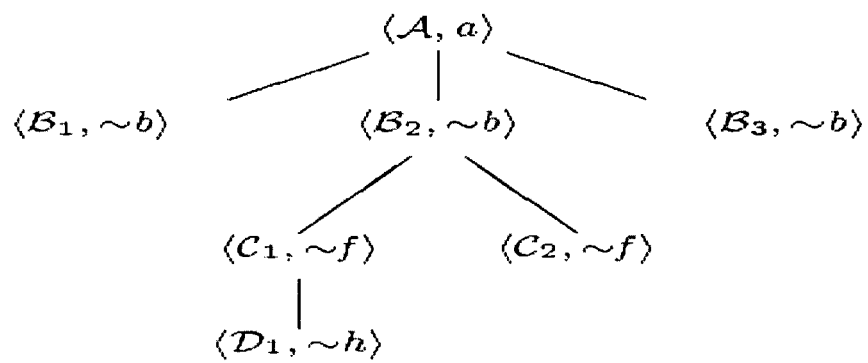
FIG. 3B is a graphic illustrating a method for building a dialectic tree with defeasible logic programming.

In a dialectical tree every vertex (except the root) represents an attack relation to its parent, and leaves correspond to non-attacked arguments. Each path from the root to a leaf corresponds to one different acceptable argumentation line. As shown in FIG. 3B, the dialectical tree provides a structure for considering all the possible acceptable argumentation lines that can be generated for deciding whether a most specific ST is defeated. This tree is called dialectical because it represents an exhaustive dialectical analysis for the argument in its root. In FIG. 3B, the atomic semantic templates are represented only by their subscript identifiers, a, b, f and h in place of $ST_a$, $ST_b$, $ST_f$ and $ST_h$.

Here, $ST_a$ is supported by <A, $ST_a$>=<{($ST_a$-<$ST_b$), ($ST_b$-<$ST_c$)}, a> and there exist three defeaters for it, each of them starting three different argumentation lines:

<$B_1$, ~$ST_b$>=<{(~$ST_b$-<$ST_c$, $ST_d$)}, ~$ST_b$> (proper defeater),

<$B_2$, ~$ST_b$>=<{(~$ST_b$-<$ST_c$, $ST_f$), ($ST_f$-<$ST_g$)}, ~$ST_b$> (proper defeater), <$B_3$, ~$ST_b$>=<{(~$ST_b$-<$ST_e$)}, ~$ST_b$> (blocking defeater).

The argument structure <$B_1$, ~$ST_b$> has the counter-argument <{($ST_b$-<$ST_c$)}, ~$ST_b$>, but it is not a defeater because the former is more specific. Thus, no defeaters for <$B_1$, ~$ST_b$> exist and the argumentation line ends there. The argument structure <$B_3$, ~$ST_b$> has a blocking defeater <{($ST_b$-<$ST_e$)}, ~$ST_b$>. It is the disagreement subargument of <A, $ST_a$>; therefore, it cannot be introduced because it produces an argumentation line that is not acceptable.

The argument structure $<B_2, ST_b>$ has two defeaters that can be introduced:

$<C_1, \sim ST_f> = <\{(\sim ST_f \sim ST_g, ST_h), (ST_h \sim ST_j)\}, \sim ST_f>$ (proper defeater), $<C_2, \sim ST_f> = <\{(\sim ST_f \sim ST_i)\}, \sim ST_f>$ (blocking defeater), Thus, one of the lines is split in two argumentation lines. The argument $<C_1, \sim ST_f>$ has a blocking defeater that can be introduced in the line: $<D_1, \sim ST_h> = <\{(\sim ST_h \sim ST_k)\}, \sim ST_h>$. Both $<D_1, \sim ST_h>$ and $<C_2, \sim ST_f>$ have a blocking defeater, but they cannot be introduced, because they make the argumentation line not acceptable. Hence the resultant sentiment value is the one of $ST_a$.

As illustrated, DLP is one way to determine both the topic and sentiment of a single phrase or sentence extracted from a source document. This degree of accuracy is not possible with traditional statistics-based methods.

Building the Recommendation Database

Figure 4:
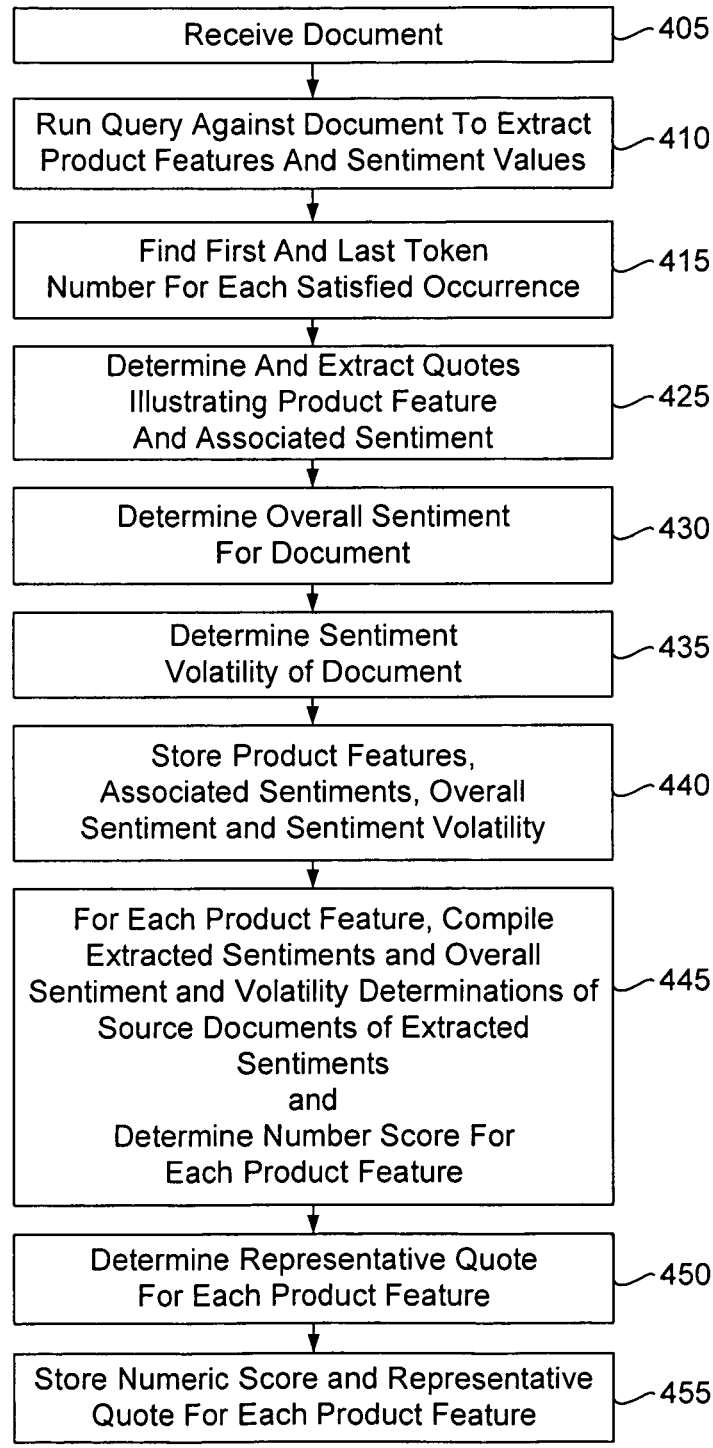
FIG. 4 is a flow chart illustrating a method for sentiment extraction from a document determining a score and representative quote for a product feature according to one embodiment.

The lexicography and templates assembled are used to extract sentiment from documents, extract quotes illustrating the sentiment and determine scores for the individual documents as well as aggregating the data from the documents to determine scores for products as a whole and features of those products. FIG. 4 is a flow chart illustrating a method for sentiment extraction from a document according to one embodiment. Documents from which data is extracted are obtained through conventional means. An example is "scraping." Documents are received 405 and stored in the document database 280 after being indexed. The text indexing engine 275 tokenizes and stems the text and eliminates stop words. This step can be accomplished by software known in the art such as LUCENE™ available from the Apache Software Foundation. Additionally, the text indexing engine 275 identifies ambiguous multiwords, words that have multiple meanings and therefore can be confused with the keywords in the lexicographies, and replaces them with an expression which cannot be confused with those in lexicographies. This addresses exceptions for atypical meanings. An example of an atypical meaning would be the phrase "would never complain about the room." "Never" in this context does not express a negative sentiment about room and the phrase "would never complain about the room" would be substituted by "would never complain" so that the syntactic template rule is not satisfied. In order to extract the product features and sentiment values about those product features from the documents, the rules engine 270 runs 410 queries on the documents. The first and last token number for each satisfied occurrence is found 415. The first and last token number indicates the positions of the first and last words in the satisfied syntactic template. The product of the query is then those tokens and the document ID of the source document so that the exact location of the quote and the source document are known.

The value of the sentiment about the feature is determined by the sentiment value of the atomic semantic template. Additionally, if that sentiment appears in the title of the document the value of the sentiment is multiplied by 1.5. In the case of a review of a hotel, a reviewer will often title the review with some statement about the hotel. If that same sentiment appears in the body of the review as well, that sentiment in the body is also multiplied by 1.5. For example, if a review is titled, "Great ocean view!" that sentiment is would ordinarily be a +1 but is 1.5*(+1.0)=+1.5 because it appeared in the title of the review. If in addition, the reviewer reiterates that sentiment in the body, by saying, for example, "enjoyed the view," that while otherwise only worth +1 would have a sentiment value of +1.5 because it is echoing the sentiment in the title.

Another query is run to do a local extraction 425 of quotes that illustrate product features and associated sentiment. Local extraction is possible because of the DLP which resolves conflicts between semantic templates. The sentiment for a quote starts with the score of the atomic semantic template adjusted if the sentiment is in the title as described above for determining the value of an extracted sentiment. Additionally for a quote, the sentiment is adjusted by the overall sentiment for the document from which it is extracted as well as the volatility of the sentiment in the document. Both the overall sentiment for the document and volatility of the sentiment in the document is described in further detail below.

The overall sentiment for a document is then determined 430. This determination is an addition of all of the sentiments for features from the document. For example a document yields the following features and sentiments: good room service +0.5; great balcony +1; not clean −1; very noisy −1; fridge was loud (noisy again) −1; and nice view +1. The sentiment for the document=(+0.5)+(+1)+(−1)+(−1)+(−1)+(+1)=−0.5.

In addition to the overall sentiment, the volatility of the sentiment for the document is determined 435. The volatility of the sentiment for the document is a determination of the degree of uniformity of the sentiment expressed in the document. This is determined by pair-wise comparisons of sentiments expressed in the document in the order in which they appear. By analyzing the sentiments in order, there is not just a comparison of the most positive and most negative sentiments but also how often the sentiment changes within the document. For a document that is a user review of a particular hotel, if the user expresses generally the same level of satisfaction (regardless of the degree of satisfaction) the document has low volatility of sentiment. If the user writing the review adored the swimming pool but found room service to be appallingly slow, the document volatility will likely be high. The determination of volatility is the sum of the absolute value if the difference between a sentiment and the next sentiment from the document. For sentiments, A, B, C and D, volatility=|A−B|+|B−C|+|C−D|. The order of A, B, C and D is the order in which they appeared in the original document from which they were extracted.

The volatility of the sentiment in the example document for which overall sentiment was previously determined, is $[(+1)-(+0.5)]+[(-1)-(+1)]+[(-1)-(-1)]+[(-1)-(-1)]+[(+1)-(-1)]=4.5$.

The determination of volatility can be used as an indicator of whether or not sarcasm is being used by the user writing the review as well. Reviewers may use sarcasm to express either satisfaction or dissatisfaction. If that sarcasm is not identified by the atomic semantic template, the sentiment expressed may be taken at face value when the document is queried with the templates. Under those circumstances, the volatility of the document however will highlight the seeming inconsistency. An example of such a review is, "The pool was gorgeous and the drinks were brought quickly. The sun was shining all week. It was just torture being there." At face value, this review would result in a middle or lower score for the hotel being reviewed. In the disclosed system, this is counteracted because in addition to an overall score, the volatility of the review is assessed. Because the first sentence includes two very positive sentiments about the hotel and the last sentence is very negative, the volatility score for this review would be higher. That leads to the reducing the score for the review and its quotes, and therefore, less likely that this quote will be shown to a user.

Alternatively or additionally, the sentiment volatility may be incorporated into a reliability score for the document. The reliability score is the inverse of the volatility score. For the example document discussed previously with a volatility of 4.5, the reliability=1/(4.5)=0.22.

Generally, the lower the volatility score of the document (or the higher the reliability), the more useful the document is and the more likely that a quote from the document will be used when recommending the product to a user of the system.

When extracting the words that make up the quotes, a heuristic model is used to extract the words that express the topic and sentiment of that phrase or sentence. This allows for enough words to be extracted to give the quote context but analyzes those words for relevance to the topic and sentiment. In contrast, traditional extraction of quotes uses less analysis and takes a pre-determined number of words before and after the word or words of interest without any assessment of whether those words are relevant. In the heuristic model, syntactic analysis determines that the additional extracted words are relevant to the topic determined for that quote—for example, the swimming pool. Semantic analysis determines if the additionally extracted words are related to the product in general—travel in this case—by looking for keywords for travel. For example, if the review stated in part, "My husband and I were fighting all week but the pool was very relaxing, with a great hot tub" a traditional extraction method extracting a quote about the swimming pool extracts words from both sides of "the pool was very relaxing" leading to " . . . were fighting all week but the pool was very relaxing, with a great hot tub . . . ." Using a heuristic model, the extracted quote would not include the portion about the reviewer and her husband's relationship. Instead, it would read, " . . . the pool was very relaxing, with a great hot tub . . . ."

The product features, associated sentiments, quotes, overall sentiment and sentiment volatility for a document are stored 440 in the recommendation database 130.

For each product feature, a score is determined 445 using sentiments extracted from multiple documents. The values of the sentiments extracted are summed in the manner that the overall score for a document is calculated as described earlier. Additionally, the determination can include the overall sentiment score for the product from multiple documents and the volatility determinations of the source document.

Additionally, for each product feature, a representative quote is determined 450 from the quotes extracted from all documents for that product feature. For example, for the feature "family-friendly" for a given hotel, the following quote from a review may be chosen, "my kids loved the pool." The quotes are ranked by their sentiment value and the quote with the most positive sentiment value for the feature being illustrated is the representative quote.

The numeric score for the product feature as well as the representative quote are also stored 455 in the recommendation database 130.

Generating Product Recommendations

Figure 5:
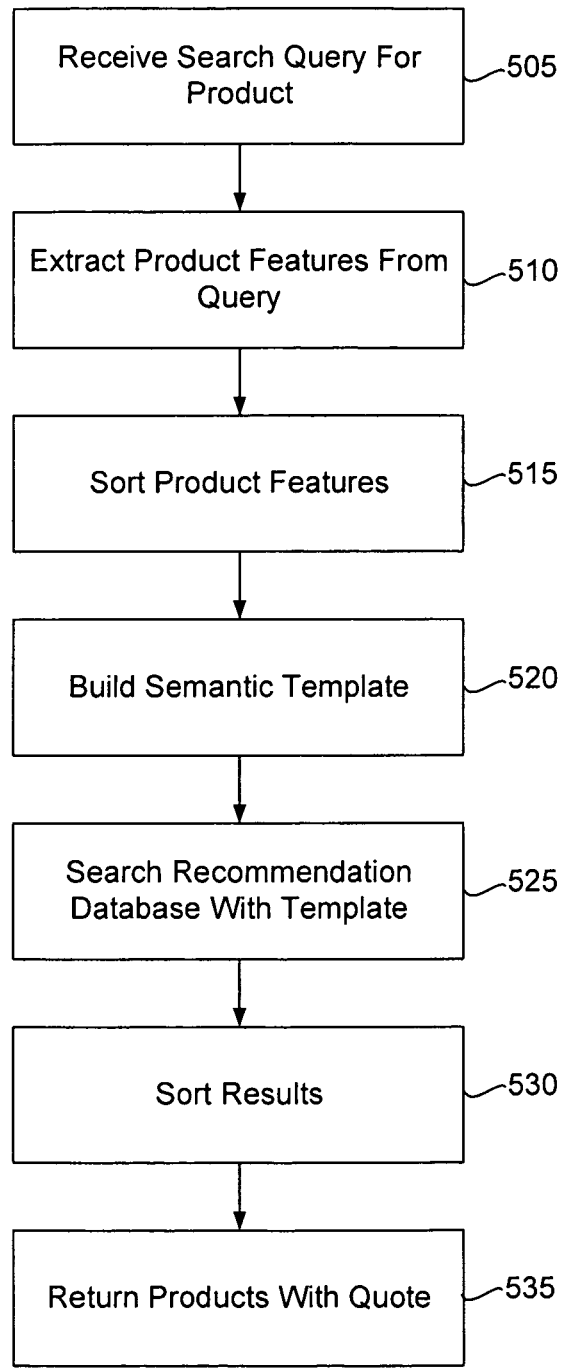
FIG. 5 is a flow chart illustrating a method for recommending a product to a user in response to a search query.

FIG. 5 is a flow chart illustrating a method for recommending a product to a user in response to a search query. Referring to both FIGS. 5 and 6, a search query is entered by a user at the client 105 and is received 505 via the network 110 at the recommendation system 100 by the front end server 115. An example is shown at 605. The recommendation engine extracts 510 features from the query. In the example, the user has requested information on "Family Friendly Hotel Campground" in Maui, the features extracted are "family-friendly" and "campground." The system sorts 515 the extracted product features based on the lexicography. Because certain words are already associated in the lexicography with family-friendly, had the query included both swimming pool and family-friendly, those features are synonymous and covered by the same templates. A semantic template is built 520 using the user's search query. That template is used to search 525 the recommendation database for products with product features that match the user's query. Searching of the recommendation database with the atomic semantic template may be implemented with a span query. The atomic semantic template built for querying the database is similar in nature to the atomic semantic template built to extract that sentiment from source documents originally. Additionally, for each product that matches the user's query, a quote is retrieved that is relevant to the feature of the product of interest to the user. In the above example, there may be many quotes about all of the hotels about any number of the hotel's features. Because the user was interested in a family-friendly hotel, the retrieved quotes 625 are relevant to that feature. Relevant quotes include those about children's activities, the swimming pool or babysitting services. Quotes about the hotel bar's top shelf liquor collection would not be relevant and not be retrieved. Additionally, the features of the hotel that make it family-friendly are also extracted and listed for the user 620. The results of the search are sorted 530 and the recommended products and quotes returned 535 to the user at the client 105 via the front end server 115 and network 110. The sorting of the results is according to the score for the feature, "family-friendly," for the hotel. In FIG. 6, the search results 610 are shown to the user with the first listing 615 having a 98% relevancy.

The disclosed system and method provides a more efficient recommendation product for users because in addition to general sentiment scores from reviewers, the user is presented with product ratings that are specific to the feature that is of interest to the user. Additionally, the characteristics of the product that led to that score are enumerated for the user as well as quotes from reviewers about the feature are presented.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description are presented in terms of algorithms and symbolic representations of operations on data bits within a computer memory and executable by a processor. Examples of this are illustrated and described for FIGS. 3, 3A, 3B, 4 and 5. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result, for example, as in describing DLP. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systems and methods for providing recommendations to users that include specific quotations Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope of the disclosure and appended additional claimable subject matter.

We claim:

1. A method for extracting quotations related to a product from a document, comprising:
    building a span query relevant to a feature associated with the product and a sentiment about the feature by:
        building syntactic templates from a lexicography relevant to the feature and the sentiment about the feature, wherein each syntactic template corresponds to multiple phrasings of the same meaning, and
        determining a first semantic template relevant to the syntactic templates;
    receiving a document;
    applying the span query to the document to generate a span query result, wherein the span query result includes a quotation from the document relevant to the feature and the sentiment about the feature, the quotation satisfying the first semantic template and including words within relative positions as constrained by the span query; and
    storing the span query result.

2. The method of claim 1 further comprising applying a heuristic model to the document.

3. The method of claim 1 wherein determining a first semantic template comprises resolving a conflict between a second and a third semantic template.

4. The method of claim 3 wherein resolving the conflict comprises applying defeasible logic programming.

5. The method of claim 1 wherein the document is a web page.

6. A non-transitory computer-readable medium having computer-readable program instructions stored therein, the computer-readable program instructions configured to, when executed by a computer, cause the computer to:
    build a span query relevant to a feature and a sentiment about the feature by:
        building syntactic templates from a lexicography relevant to the feature and the sentiment about the feature, wherein each syntactic template corresponds to multiple phrasings of the same meaning; and
        determining a first semantic template relevant to the syntactic templates;
    receive a document;
    apply the span query to the document to generate a span query result, wherein the span query result includes a quotation from the document relevant to the feature and the sentiment about the feature, the quotation satisfying the first semantic template and including words within relative positions as constrained by the span query; and
    store the span query result.

7. The non-transitory computer-readable medium of claim 6 wherein the computer-readable program instructions are further configured to, when executed by the computer, cause the computer to apply a heuristic model to the document.

8. The non-transitory computer-readable medium of claim 6 wherein determining a first semantic template comprises resolving a conflict between a second and a third semantic template.

9. The non-transitory computer-readable medium of claim 8 wherein resolving the conflict comprises applying defeasible logic programming.

10. The method of claim 1 wherein determining a first semantic template relevant to the syntactic template comprises:
    building at least one atomic semantic template from the syntactic template; and
    building a complex semantic template from the at least one atomic semantic template wherein the complex semantic template comprises at least one prohibitive clause, the at least one prohibitive clause comprising an expression relevant to the feature that does not convey sentiment.

11. The method of claim 10 wherein:
    building at least one atomic semantic template comprises building a first and a second atomic semantic template; and building the complex semantic template comprises resolving a conflict between the first and the second atomic semantic templates.

12. The non-transitory computer-readable medium of claim 6 wherein determining a first semantic template relevant to the syntactic template comprises:

building at least one atomic semantic template from the syntactic template; and building a complex semantic template from the at least one atomic semantic template wherein the complex semantic template comprises at least one prohibitive clause, the at least one prohibitive clause comprising an expression relevant to the feature that does not convey sentiment.

13. The non-transitory computer-readable medium of claim 12 wherein:

building at least one atomic semantic template comprises building a first and a second atomic semantic template; and building the complex semantic template comprises resolving a conflict between the first and the second atomic semantic templates.

14. The method of claim 1 wherein the feature is an abstract characteristic.

15. The non-transitory computer-readable medium of claim 6 wherein the feature is an abstract characteristic.

16. The method of claim 1, further comprising:

building one or more additional span queries;

applying the one or more additional span queries to the document; and storing additional span query results from applying the one or more additional span queries.

17. The non-transitory computer-readable medium of claim 6, wherein the computer-readable program instructions are further configured to, when executed by the computer, cause the computer to:

build one or more additional span queries;

apply the one or more additional span queries to the document; and store additional span query results from applying the one or more additional span queries.

18. An apparatus, comprising:

a processor configured to:

build a span query relevant to a feature associated with a product and a sentiment about the feature by:

building syntactic templates from a lexicography relevant to the feature and the sentiment about the feature, wherein each syntactic template corresponds to multiple phrasings of the same meaning, and determining a first semantic template relevant to the syntactic templates;

receiving a document;

apply the span query to the document to generate a span query result, wherein the span query result includes a quotation from the document relevant to the feature and the sentiment about the feature, the quotation satisfying the first semantic template and including words within relative positions as constrained by the span query.

19. The apparatus of claim 18, wherein the processor configured to determine the first semantic template comprises the processor being configured to resolve a conflict between a second and a third semantic template by applying defeasible logic programming.

20. The apparatus of claim 18, wherein the processor configured to determine a first semantic template relevant to the syntactic template includes the processor being configured to:

build at least one atomic semantic template from the syntactic template; and build a complex semantic template from the at least one atomic semantic template.

21. The apparatus of claim 18, wherein the complex semantic template comprises at least one prohibitive clause, the at least one prohibitive clause comprising an expression relevant to the feature that does not convey sentiment.

22. The apparatus of claim 21, wherein:

the processor configured to build the at least one atomic semantic template includes the processor being configured to build a first and a second atomic semantic template; and the processor configured to build the complex semantic template includes the processor being configured to resolve a conflict between the first and the second atomic semantic templates.

\* \* \* \* \*

UNITED STATES PATENT AND TRADEMARK OFFICE
CERTIFICATE OF CORRECTION

PATENT NO. : 9,646,078 B2  
APPLICATION NO. : 12/119465  
DATED : May 9, 2017  
INVENTOR(S) : Galitsky et al.

Page 1 of 1

It is certified that error appears in the above-identified patent and that said Letters Patent is hereby corrected as shown below:

In the Claims

Column 18,
Line 31, "claim 18" should read --claim 20--.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*